May 2, 1939.  C. R. STEWART  2,156,407
VISCOSIMETER
Filed Sept. 26, 1938
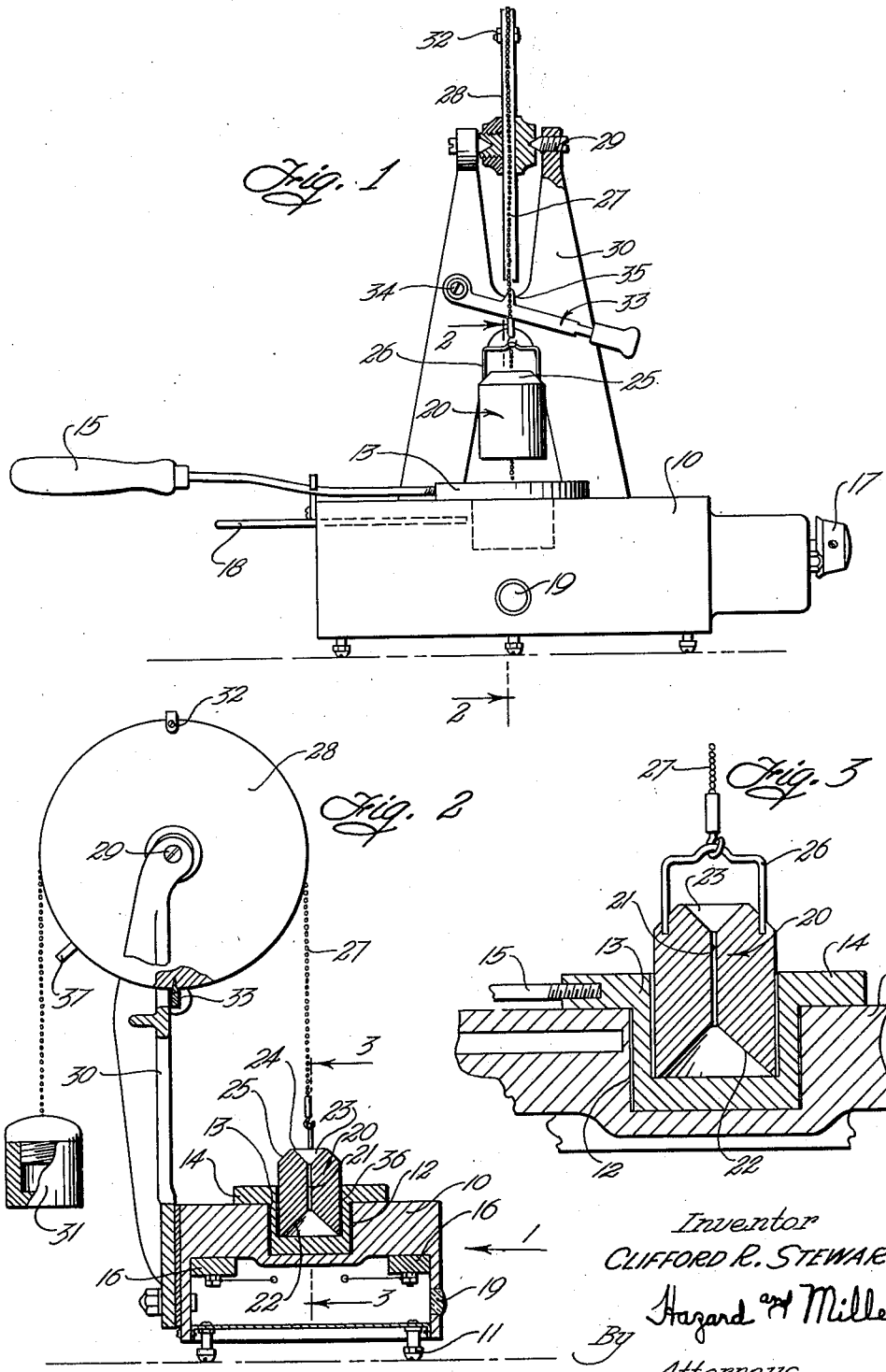
Inventor
CLIFFORD R. STEWART
By Hazard and Miller
Attorneys Patented May 2, 1939

2,156,407

UNITED STATES PATENT OFFICE 2,156,407

VISCOSIMETER

Clifford R. Stewart, Los Angeles, Calif., assignor to Faber Laboratories, Inc., Los Angeles, Calif., a corporation of California Application September 26, 1938, Serial No. 231,726

4 Claims. (Cl. 265—11)

This invention relates to improvements in viscosimeters.

An object of the invention is to provide a mechanism of relative simple and durable construction which can be easily and quickly employed to obtain a measurement of the viscosity of a sample of liquid or semi-liquid.

By means of the improved viscosimeter a measurement or figure is obtained representative of the sample and of the cumulative effects of fluidity, weight, cohesion, adhesion, contamination, and oiliness. In most prior devices designed to measure the viscosity of a sample of liquid or semi-liquid, it is necessary that any foreign substances be filtered out of the sample before a satisfactory reading of the device may be obtained. Consequently, with the use of such devices the reading obtained for a contaminated liquid is unable to include the effect of the contaminating substance on the viscosity of the sample tested.

An important advantage of the present construction is that a satisfactory reading may be obtained even though the liquid that is being tested is contaminated, such as for example carbon in oil. By the present construction the sample does not have to be filtered but is tested in its contaminated condition so that the reading obtained includes the effect of the contaminating substance on the resultant viscosity.

Another object of the invention is to provide a viscosimeter which will require only a small quantity of liquid or semi-liquid in order to make a test or determination of its viscosity and which may be operated at room temperatures or any desired temperature thereabove.

Another object of the invention is to provide a viscosimeter which will enable successive readings of a given sample to be easily and quickly obtained for purposes of averaging the results of the reading. By the use of the present construction it is unnecessary to clean the apparatus between consecutive readings or tests but the same sample may be used over and over again without cleaning to obtain a multiplicity of readings if desired.

Another object of the invention is to provide a viscosimeter which is of simple design yet which readily permits of the obtaining highly accurate readings or measurements representative of the viscosity of samples to be tested.

With the foregoing and other objects in view, which will be made manifest in the following detailed description and specifically pointed out in the appended claims, reference is had to the accompanying drawing for an illustrative embodiment of the invention, wherein:

Figure 1 is a view in front elevation of the improved viscosimeter;

Fig. 2 is a transverse vertical section taken substantially upon the line 2—2 upon Fig. 1 in the direction indicated; and Fig. 3 is a partial view in vertical section taken substantially upon the line 3—3 upon Fig. 2.

Referring to the accompanying drawing wherein similar reference characters designate similar parts throughout, the improved viscosimeter comprises a small metal table 10 of suitable size and shape preferably supported on leveling screws 11. In the top surface of this table there is formed a central well 12 designed to receive a receptacle 13 flanged as at 14 and preferably equipped with a handle 15. Within the table there are disposed suitable heating electric elements 16 which may be connected through an adjustable rheostat to a suitable source of electric current. The rheostat may be of any conventional construction and is shown as being adjustable by means of a knob or handle 17. By adjusting the rheostat the heating elements 16 may be caused to heat the receptacle 13 and its contents to any desired temperature at which it is desired to obtain a reading. The temperature may be measured by means of a thermometer 18 inserted into a thermometer well in the end of the table so as to have its bulb positioned rather closely to the receptacle 13. The reference 19 indicates a telltale lens behind which there may be a small filament or electric light to indicate whether or not the electric circuit through the heating element 16 is closed.

A body 20 is provided which enters and largely occupies the receptacle 13. This body is preferably formed of metal and has a vertical central bore 21 formed therein. The bottom surface of the body is preferably coned out as indicated at 22 with the apex of the cone arranged at the bottom of the bore. The upper end of the bore 21 communicates with the bottom of a coned out receptacle 23, the edge of which is indicated at 24 and outwardly of this edge the body is tapered or beveled off as indicated at 25. The body 20 is equipped with a bale 26 by means of which it may be suspended from a chain or equivalent flexible element indicated at 27 which is trained over a grooved wheel or pulley 28 mounted for free rotation on bearings 29 mounted on a standard 30 arranged at the back of the table. The opposite end of the chain or flexible element 27 is connected to a counterweight receptacle 31 designed to contain shot, mercury, or other weighting substance in an amount slightly in excess of the weight of body 20. A clamp 32 is mounted on top of the wheel or pulley 28 so as to be arranged preferably directly over the bearings 29 when the bottom of the body 20 is at the bottom of the receptacle 13. This clamp serves to hold the chain or flexible element 27 against shift and also provides some weight which is effective to operate in conjunction with the counterweight when the device is in operation.

A brake arm 33 is pivoted as at 34 on the standard and carries a pointed projection 35 adapted to enter the groove on the wheel or pulley 28 to hold the wheel or pulley against rotation. This brake arm is frictionally held in any adjusted position. By swinging the brake arm downwardly the wheel or pulley 28 is disengaged and is free to be rotated by the effect of the counterweight. Rotation of the wheel or pulley 28 under the influence of the counterweight is limited by stop 37 which is engageable with standard 30.

The manner in which a sample is tested is as follows: A sample of liquid is placed in receptacle 13 and it may be permitted to remain at room temperature or it may receive heat conducted thereto by the table top and receptacle from the heating elements. The body 20 is then forced into the receptacle over the sample of liquid therein. The liquid is to some extent displaced by the body 20 and is forced upwardly through bore 21 into receptacle 23. It is also forced upwardly in the slight clearance 36 between the exterior of the body and the walls of the receptacle. There should be sufficient liquid present so that the receptacle 23 will be completely filled and will overflow over the rim or edge 24.

The brake 33 is held in engagement with the wheel or pulley 28 until the overflowing liquid has overflowed completely and the rim or edge 24 becomes readily visible through the sample. In this manner by forcing the body 20 to the bottom of the receptacle, causing the liquid to flow up through bore 21 and to overflow the rim or edge 24, uniform conditions are obtained in testing various samples of liquid for their viscosity.

When the rim or edge 24 becomes readily visible the brake 33 is then swung downwardly to release the wheel or pulley 28. The time required for the counterweight in receptacle 31 to lift or move the body 20 any predetermined distance or to any predetermined position is then carefully noted with a stop-watch. Usually the time is noted which elapses between the release of the brake and the time that the body 20 emerges from the liquid, although it will be understood that any other limits for elapsed time may be selected. This time is the reading obtained from the viscosimeter which is indicative or representative of the sample tested. The weight of the clamp 32 tends to cooperate with the counterweight in lifting body 20 as soon as this clamp is moved off center. While this clamp does assist in lifting body 20, its effect is uniform on all samples tested.

The amount of clearance between the body and the walls of the receptacle and the diameter of the bore 21 may vary on different instruments, and when there is variation, the instrument must of course be calibrated against a master viscosimeter or fluid and corrections made in the readings obtained. A suitable clearance, however, is fifteen thousandths of an inch and likewise a suitable diameter of bore 21 is twenty-three thousandths of an inch.

It will be noted that with the improved instrument it is not necessary to clean the viscosimeter or to re-adjust the instrument in order to obtain successive readings on the same sample. After having obtained one reading it is possible to force the body 21 back down in the receptacle in its initial position. Then, when the rim 24 reappears through the overflowing liquid the brake is again released and a succeeding reading obtained. Thus, a multiplicity of readings may be quickly obtained with the same sample without cleaning the instrument in order to obtain an average of all readings for the sample.

It will also be noted that it is not required that the sample of liquid tested be free of any contaminating or foreign substance. The contaminating substance may remain in the sample and when the reading is obtained, the effect thereof is included. The reading obtained which is the time required for the counterweight to lift the body out of the receptacle under the conditions present is indicative of the cumulative result of the following factors: Fluidity of the liquid, the weight of the liquid, the cohesion of the liquid, the adhesion of the liquid, the effect of any contaminating or foreign substance in the liquid and the oiliness of the liquid.

In order to convert the reading obtained to a corresponding reading on other conventional types of viscosity measuring devices, it is merely required to develop a close calibration scale for any particular instrument. This scale will vary somewhat, depending upon the extent to which the counterweight overbalances the weight of the body 20.

During operation of the present viscosimeter with a sample it may be determined that a temperature equilibrium has been obtained or established by repeated tests on the sample giving the same reading.

From the above-described construction it will be appreciated that the improved viscosimeter is simple and durable and that it enables readings to be obtained from samples tested very quickly and accurately. The reading obtained is a true indication of the viscosity of the sample as it exists in the condition in which it is desired to test it for its viscosity. In other words, no special preparation, such as filtering, is required to obtain the reading indicative of the viscosity on this device.

Various changes may be made in the details of construction without departing from the spirit or scope of the invention as defined by the appended claims.

I claim:

1. A viscosimeter comprising means providing a receptacle adapted to contain a sample to be tested, a body adapted to be positioned in the receptacle and to fit therein with a small clearance having a passage therethrough communicating with a receptacle in said body, and means for imposing a predetermined force tending to lift the body from said receptacle.

2. A viscosimeter comprising a body having a bore therethrough terminating at its upper end in a receptacle of predetermined capacity, means forming a receptacle which said body may enter with a small clearance, and means for applying a predetermined lifting force to said body.

3. A viscosimeter comprising means providing a receptacle, means for heating the receptacle and determining the temperature thereof, a body adapted to largely fill the receptacle having a bore therethrough terminating at its upper end in a receptacle of predetermined capacity, and means for applying a predetermined lifting force to the body.

4. A viscosimeter comprising means providing a receptacle, means for heating the receptacle and determining the temperature thereof, a body adapted to largely fill the receptacle having a bore therethrough terminating at its upper end in a receptacle of predetermined capacity, means for applying a predetermined lifting force to the body comprising a counterweight, a flexible element connecting the counterweight to the body, a pulley over which the flexible element is trained, and brake means for releasing or stopping rotation of the pulley.

CLIFFORD R. STEWART.